United States Patent
Linsmeier et al.

(12)

(10) Patent No.: US 11,427,143 B1
(45) Date of Patent: Aug. 30, 2022

(54) ELECTRICAL LOAD MANAGEMENT IN A VEHICLE

(71) Applicant: Oshkosh Defense, LLC, Oshkosh, WI (US)

(72) Inventors: Cathy Linsmeier, Oshkosh, WI (US); Ryan Bishop, Oshkosh, WI (US); Luke Gustafson, Oshkosh, WI (US); Eric Pederson, Oshkosh, WI (US); Noah Johnson, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 710 days.

(21) Appl. No.: 15/957,577

(22) Filed: Apr. 19, 2018

Related U.S. Application Data

(60) Provisional application No. 62/491,985, filed on Apr. 28, 2017, provisional application No. 62/491,990, (Continued)

(51) Int. Cl.
*B60R 16/03* (2006.01)
*H02J 7/14* (2006.01)
(Continued)

(52) U.S. Cl.
CPC ........ *B60R 16/0307* (2013.01); *B60R 16/033* (2013.01); *G07C 5/02* (2013.01);
(Continued)

(58) Field of Classification Search
None
See application file for complete search history.

(56) References Cited

U.S. PATENT DOCUMENTS 4,315,204 A * 2/1982 Sievers ................ H02J 7/1461
322/28
4,854,807 A 8/1989 Bishop
(Continued)

FOREIGN PATENT DOCUMENTS

EP 2706367 A1 * 3/2014 ........... G01R 31/343

OTHER PUBLICATIONS

Zhang; Fault Diagnosis of Automotive Electric Power Generation and Storage Systems; Sep. 2010; https://ieeexplore.ieee.org/stamp/stamp.jsp?tp=&arnumber=5611179 (Year: 2010).*

*Primary Examiner* — David P. Merlino
(74) *Attorney, Agent, or Firm* — Foley & Lardner LLP

(57) ABSTRACT

A vehicle includes a prime mover, a charging system, a plurality of electrical loads electrically coupled to the charging system, and a controller. The charging system is coupled to the prime mover and includes a charge storing device and an alternator. The alternator is configured to convert mechanical energy generated by prime mover into electrical energy to charge the charge storing device. The electrical loads are electrically coupled to the charging system via a power distribution module. The controller is configured to receive an indication that an electrical output of the charging system is unable to provide sufficient electrical energy to each of the plurality of electrical loads, and provide a control signal to the power distribution module in response to the indication. The control signal is configured to cause the power distribution module to decouple at least one of the plurality of electrical loads from the charging system.

6 Claims, 4 Drawing Sheets

Related U.S. Application Data filed on Apr. 28, 2017, provisional application No. 62/491,992, filed on Apr. 28, 2017.

(51) Int. Cl.
  *G07C 5/02* (2006.01)
  *B60R 16/033* (2006.01)
  *H02J 7/00* (2006.01)

(52) U.S. Cl.
  CPC .......... *H02J 7/0047* (2013.01); *H02J 7/1438* (2013.01); *H02J 7/0048* (2020.01)

(56) References Cited

U.S. PATENT DOCUMENTS

| | | | |
|---|---|---|---|
| 6,194,877 B1* | 2/2001 | Judge | H02J 7/1461 320/162 |
| 6,622,397 B1 | 9/2003 | Knoble | |
| 6,646,845 B1* | 11/2003 | Turner | H02J 9/002 307/10.7 |
| 6,778,078 B1* | 8/2004 | Han | G08B 3/10 340/384.4 |
| 6,882,917 B2 | 4/2005 | Pillar et al. | |
| 7,392,122 B2 | 6/2008 | Pillar et al. | |
| 7,451,028 B2 | 11/2008 | Pillar et al. | |
| 7,756,621 B2 | 7/2010 | Pillar et al. | |
| 8,333,390 B2 | 12/2012 | Linsmeier et al. | |
| 2001/0025889 A1* | 10/2001 | Salberg | B60H 1/2206 237/12.1 |
| 2005/0200201 A1* | 9/2005 | Jabaji | H02J 7/0048 307/10.1 |
| 2005/0285445 A1* | 12/2005 | Wruck | H02J 1/14 307/10.1 |
| 2008/0084182 A1* | 4/2008 | Oberlin | H01M 10/052 320/116 |
| 2010/0121590 A1* | 5/2010 | Kato | B60W 50/08 702/63 |
| 2014/0195062 A1* | 7/2014 | Stanczak | G05F 3/02 700/294 |
| 2014/0343831 A1* | 11/2014 | Hosey | H02J 7/0032 701/113 |
| 2017/0125784 A1* | 5/2017 | Dulle | H01M 10/4207 |
| 2017/0201197 A1* | 7/2017 | Res | H02P 29/027 |
| 2017/0349048 A1* | 12/2017 | Nakayama | B60L 1/003 |
| 2018/0182583 A1* | 6/2018 | Kato | H01H 47/001 |
| 2019/0016357 A1* | 1/2019 | Smith | H02P 29/0241 |
| 2019/0276042 A1* | 9/2019 | Higashitani | H02P 9/04 |

* cited by examiner

ELECTRICAL LOAD MANAGEMENT IN A VEHICLE

CROSS-REFERENCES TO RELATED APPLICATIONS

This application claims the benefit of U.S. Provisional Application No. 62/491,985, filed Apr. 28, 2017, U.S. Provisional Application No. 62/491,992, filed Apr. 28, 2017, and U.S. Provisional Application No. 62/491,990, filed Apr. 28, 2017, all of which are incorporated herein by reference in their entireties.

BACKGROUND

Vehicles traditionally include alternators that are mechanically coupled to an engine. Rotational energy from the engine rotates a rotor in the alternator that produces alternating current (AC) in a set of stator coils. The AC is then rectified and used to charge a battery in the vehicle. Voltage from the battery may be used to power various direct current (DC) loads (e.g., lighting systems, displays, controllers, etc.) in the vehicle. Faults in either the battery or alternator result in insufficient electrical energy being supplied to the DC loads. Thus, it would be beneficial to provide a system for prioritizing these loads in the event of the malfunctioning of such components.

SUMMARY

According to one aspect of the disclosure, a vehicle is disclosed. The vehicle includes a prime mover. The vehicle includes a charging system coupled to the prime mover. The charging system includes a charge storing device and an alternator. The alternator is configured to convert mechanical energy generated by the prime mover into electrical energy to charge the charge storing device. The vehicle includes a plurality of electrical loads electrically coupled to the charging system via a power distribution module. The vehicle includes a controller communicably coupled to the charging system. The controller is configured to receive an indication that an electrical output of the charging system is unable to provide sufficient electrical energy to each electrical load in the plurality of electrical loads. The controller is configured to provide a control signal to the power distribution module in response to the indication. The control signal is configured to cause the power distribution module to decouple at least one of the plurality of electrical loads from the charging system.

According to another aspect of the disclosure, a method of electrical load management in a vehicle is disclosed. The method includes monitoring a charge level of a charge storing device. The method includes determining whether the charge level of the charge storing device is sufficient for providing electrical energy to each of a plurality of electrical loads coupled thereto through a power distribution module. The method includes generating one or more control signals for the power distribution module to selectively decouple at least one of the plurality of electrical loads from the charge storing device responsive to determining that the charge level of the charge storing device is insufficient for providing electrical energy to each of the plurality of electrical loads.

According to another aspect of the disclosure, a method of electrical load management in a vehicle is disclosed. The method includes monitoring an energy output from an alternator that converts mechanical energy from a prime mover into electrical energy to charge a charge storing device. The method includes monitoring a charge level of the charge storing device, the charge storing device powering a plurality of electrical loads electrically coupled thereto via a power distribution module. The method includes identifying a malfunction in one of the alternator and the charge storing device based on at least one of the monitored energy output from the alternator and the monitored charge level of the charge storing device. The method includes generating one or more control signals for the power distribution module to selectively decouple at least one of a plurality of electrical loads from the charge storing device responsive to identifying the malfunction.

The invention is capable of other embodiments and of being carried out in various ways. Alternative exemplary embodiments relate to other features and combinations of features as may be recited in the claims.

BRIEF DESCRIPTION OF THE DRAWINGS

The disclosure will become more fully understood from the following detailed description, taken in conjunction with the accompanying figures, in which.

DETAILED DESCRIPTION

Before turning to the figures which illustrate the exemplary embodiments in detail, it should be understood that the application is not limited to the details or methodology set forth in the following detailed description or illustrated in the figures. It should also be understood that the phraseology and terminology employed herein is for the purpose of description only and should not be regarded as limiting.

According to an exemplary embodiment, a controller for a vehicle (e.g., an automobile, emergency response vehicle, broadcasting vehicle, etc.) is provided. The controller interfaces with a charging system of the vehicle to selectively decouple electrical loads from the charging system in the event that certain conditions are detected. For example, the controller may receive an indication that a battery is failing to charge even though the field current supplied to an alternator of the charging system has increased. In response to receiving such an indication, the controller provides a control signal to a power distribution system in the vehicle to decouple a predetermined electrical load from the charging system. As such, the overall electrical load on the charging system is selectively reduced to efficiently use the limited power provided by the malfunctioning charging system.

In some embodiments, the electrical load that is decoupled from the charging system is pre-selected by a user of the vehicle. Thus, the systems and methods disclosed herein allow a user to tailor the set of electrical loads that are powered in the event that limited power is available.

Figure 1:
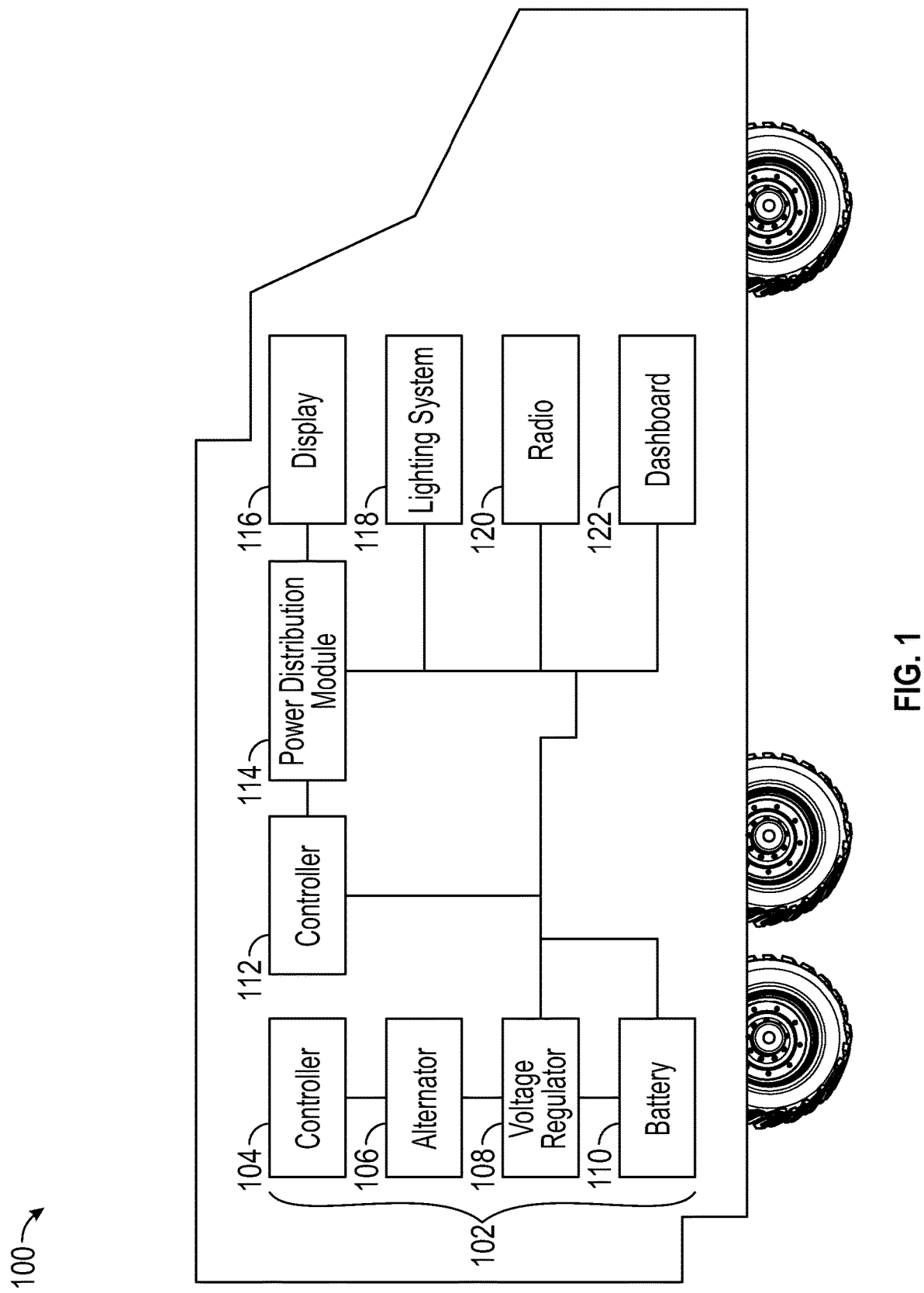
FIG. 1 is a block diagram of a vehicle including various features described herein, according to an exemplary embodiment.

Referring generally to FIG. 1, a vehicle is shown as vehicle 100. Vehicle 100 generally comprises a chassis, a cab supported at a front portion of the chassis, a body supported by the chassis rearward of the cab, a drive system for operating the vehicle and/or one or more systems thereof, and a fluid delivery system. According to an exemplary embodiment, the vehicle 100 is a military ground vehicle. In other embodiments, the vehicle 100 is an off-road vehicle such as a utility task vehicle, a recreational off-highway vehicle, an all-terrain vehicle, a sport utility vehicle, and/or still another vehicle. In yet other embodiments, the vehicle 100 is another type of off-road vehicle such as mining, construction, and/or farming equipment. In still other embodiments, the vehicle 100 is an aerial truck, a rescue truck, an aircraft rescue and firefighting (ARFF) truck, a concrete mixer truck, a refuse truck, a commercial truck, a tanker, an ambulance, and/or still another vehicle.

Vehicle 100 includes a charging system, shown as charging system 102. Charging system 102 includes a prime mover of the vehicle 100, shown as an engine 104, a power generator, shown as an alternator 106, a regulator, shown as voltage regulator 108, and a power storage device, shown as a battery 110. Examples of suitable engine 104 include, but are not limited to, an internal combustion gas-powered engine, a diesel engine, a fuel cell driven motor, an electric motor, or any other type of motor capable of providing mechanical energy. Any of the above mentioned prime movers may be used alone or in combination with one or more additional power sources (as in a hybrid vehicle) to provide mechanical energy. Engine 104 generates mechanical energy (e.g., angular momentum) from an energy source (e.g., fuel). Such mechanical energy may be coupled to a motion transfer device (e.g., a transmission), which provides the energy to various motive members (e.g., wheels via a differential or the like) of the vehicle 100.

Additionally, rotational energy generated by the engine 104 may also be transferred to an alternator 106. For example, a belt may be coupled to a member (e.g., crankshaft) of the engine 104. A component of an alternator 106 (e.g., a rotor coil) may also be coupled to the belt via a pulley system. The rotational energy provided to the alternator 106 is converted to electrical energy which is used to power various other components of the vehicle 100. Alternator 106 generally includes a rotor coil and a set of stator coils. The rotor coil may be any form of electromagnet. In an embodiment, the rotor coil comprises a coil of electrically-conductive wire wrapped around an iron core. In an alternative embodiments, the rotor coil comprises plurality of electromagnet teeth that engage with one another around an axis of the rotor coil so as to provide a rotational variation in magnetic polarity around the axis. In any event, the alternator 106 includes a member (e.g., brush, slip ring, etc.) configured to receive current either generated by the alternator 106 or from the battery 110 and provide a current to the rotor coil. The current creates a magnetic field in the electromagnets in the rotor coil. Additionally, rotational energy from the engine rotates the rotor coil, thus producing a rotationally changing magnetic field in the area surrounding the rotor coil. Such a magnetic field in turn induces alternating current in the set of stator coils. This alternating current is then rectified with a set of electrical components (e.g., diodes) to produce a DC-like field current, which is then used to charge the battery 110. Additionally, a portion of the field current may be fed to the voltage regulator 108.

In some embodiments, the alternator 106 includes various sensors (not shown) to measure various aspects of the operation of the alternator 106. For example, a rotational sensor may measure the rotation rate of the rotor coil. Various ammeters may measure the current at various stages (e.g., prior to or after the rectifier diodes) of the alternator 106.

Voltage regulator 108 is configured to maintain the output voltage of the charging system 102 within a predetermined operating range. In an embodiment, the voltage regulator 108 is integrated with (i.e. disposed on or in the same housing as the alternator 106). In various alternative embodiments, the voltage regulator 108 is separate from the alternator 106.

In an embodiment, the voltage regulator 108 includes an electromechanical relay (e.g., configured to close a circuit when a voltage produced by the battery is insufficient to counteract a field induced by the field current produced by the stator coils of the alternator 106). In an alternative embodiment, the voltage regulator 108 is a solid state device. Any suitable type of voltage regulator may be used. In some embodiments, the output voltage of the battery 110 is an input to the voltage regulator 108. The voltage regulator 108 controls the voltage produced by the alternator 106 by controlling the level of field current introduced into the rotor coil. In an embodiment, if the voltage of the battery 110 is above or within a predetermined operating range (e.g., indicating a full charge), no field current is supplied to the rotor coil. However, if the voltage of the battery 110 is below the operating range (e.g., indicating a drain on the battery 110 by various electrical loads of the vehicle 100), the field current provided to the rotor coil is increased so as to charge the battery 110.

In various embodiments, the voltage regulator 108 includes various measuring devices (not shown) configured to measure the state of operation of the charging system 102. For example, in one embodiment, the voltage regulator 108 includes a voltmeter configured to measure the output voltage generated by the alternator 106 and an ammeter configured to measure the field current generated by the alternator 106. An additional sensor may measure the output voltage of the battery 110.

Battery 110 is configured to provide a voltage used to power various electrical loads (e.g., the controller 112, display 116, etc.) of the vehicle 100. In an embodiment, battery 110 is a lead acid battery. As such, the battery 110 includes a positive lead dioxide electrode, a negative electrode constructed of lead, and an acid mixture (e.g., sulfuric acid and water) disposed in a container. The positive electrode undergoes a positive chemical reaction (e.g., emitting electrons to produce a net positive charge on the positive electrodes), and the negative electrode undergoes a negative chemical reaction (e.g., gathering electrons to produce a net negative charge on the negative electronic) to produce a charge difference between the electrodes. This charge difference creates a voltage that may be used to provide a current to electrical loads in the vehicle 100. After the battery is discharged, the charge must be replenished via the current produced by the alternator 106. As such, the battery 110 is electrically coupled to the alternator 106. In various alternative embodiments, any other suitable type of charge storage device may be used in place of the battery 110.

Still referring to FIG. 1, the vehicle 100 includes a control system, shown as controller 112. By way of overview, the controller 112 includes a plurality of interfaces facilitating the controller 112 receiving from the charging system 102 and providing current to various electrical loads 116-122 of the vehicle 100. As such, the controller 112 facilitates the provision of electrical power generated by the charging system 102 to the electrical loads 116-122. A more detailed description of the controller 112 will be provided below in relation to FIG. 2.

Vehicle 100 further includes a number of electrical loads, shown as a display 116, lighting system 118, radio 120, and dashboard 122. In various embodiments, the vehicle 100 includes additional electrical loads (e.g., an engine controller, transmission controller, anti-lock brake system, windshield wiper system, etc.). In some embodiments, the electrical loads 116-122 are electrically connected to the controller 112 via a wiring system (e.g., wire harness) of the vehicle 100. Lighting system 118 may include a set of conductors and light emitting elements (e.g., brake lights, headlights, internal lights, etc.) configured to produce light from current supplied by the battery 110 and direct the light to various points of interest. Radio 120 is configured to receive power from the battery 110 and generally includes an antenna configured to receive radio signals and produce sounds audible to a user. Dashboard 122 may include a plurality of indicators (e.g., an RPM meter, a speedometer, fuel gage, etc.) configured to present the user with the operational state of various components of the vehicle 110. As such, the dashboard 122 is electrically coupled to the battery 110 and the controller 112 to receive signals measured by various sensors disposed throughout the vehicle 100.

Display 116 may be, for example, a display (e.g., a CANlink® CL-711 display manufactured by HED Inc., etc.) having an interface (e.g., a touchscreen, a display with a row of buttons disposed along one side thereof, etc.) that receives an input from a user. Display 116 may support any type of display feature, such as a flipbook-style animation, or any other type of transition feature. Display 116 may generally provide a plurality of navigation buttons that allow a user to select various displays and other options via touch. Display 116 may further, upon detection of a sensor signal captured by the charging system 102, generate a graphical representation of the sensor signal. For example, if a signal is received from a voltage meter attached to the battery 110, a notification of the voltage level of the battery 110 may be presented. Display 116 may have a wired or wireless connection with other response vehicle subsystems and/or with remote devices.

The display 116 may be configured to display a graphical user interface, an image, an icon, a notification, and indication, and/or still other information. In the exemplary embodiment shown, the display includes a graphical user interface configured to provide general information about the vehicle 100 captured by the various sensing devices included in the vehicle 100. Through such an interface, the operator may be to select various electrical loads 116-122 to decouple from the charging system 102 via the methods described herein.

The display 116 may include any number of supporting buttons and other tactile user inputs to support interaction between a user and the display. For example, a plurality of push buttons may be located next to or below the display to provide the user with further options. It should be understood that the configuration of the display 116 may vary without departing from the scope of the present disclosure.

The display 116 may include or support various technologies. For example, the display 116 be a touchscreen display and may be separated into any number of portions (e.g., a split-screen type display, etc.). For example, a first portion of the screen may be reserved for one particular type of display (e.g., warnings and alerts, etc.), while another portion of the screen may be reserved for general vehicle information (e.g., speed, fuel level, etc.). The display 116 may be configured to handle any type of transition, animation, or other display feature that allows for ease of access of information on the display.

In one embodiment, the display 116 is coupled to a USB input, allowing the display software to be updated. For example, such updates may include updating the maps stored on the display (e.g., to improve navigation features, etc.). Further, custom files may be downloaded to the display (e.g., custom logos, images, text, etc.) to personalize the display 116 for use in the vehicle 100.

The display may include any number of video inputs (e.g., from one or more cameras located on the vehicle 100, etc.). For example, the display may be capable of receiving four video inputs and may display up to four video inputs simultaneously on the display. The display may be configured to detect when a camera feed is up, therefore determining when to display a video input on the display or not (e.g., not displaying a blank or blue screen, etc.).

Still referring to FIG. 1, the vehicle 100 further includes a power distribution device, shown as a power distribution module 114. The power distribution module 114 is configured to selectively couple various electrical loads 116-122 to the charging system 102. In one embodiment, the power distribution module 114 decouples electrical loads 116-122 based on signals received from the controller 112. In this regard, the power distribution module 114 may include an electrical switch box that receives the voltage output by the battery 110 as an input. Power distribution module 114 further includes a plurality of output lines connected to each of the electrical loads 116-122. The power distribution module 114 may include an electrical switch on each of the output lines. The switches may be selectively opened or closed based on electrical signals received from the controller 112. Any suitable electrical switching device may be utilized as the power distribution module 114.

Figure 2:
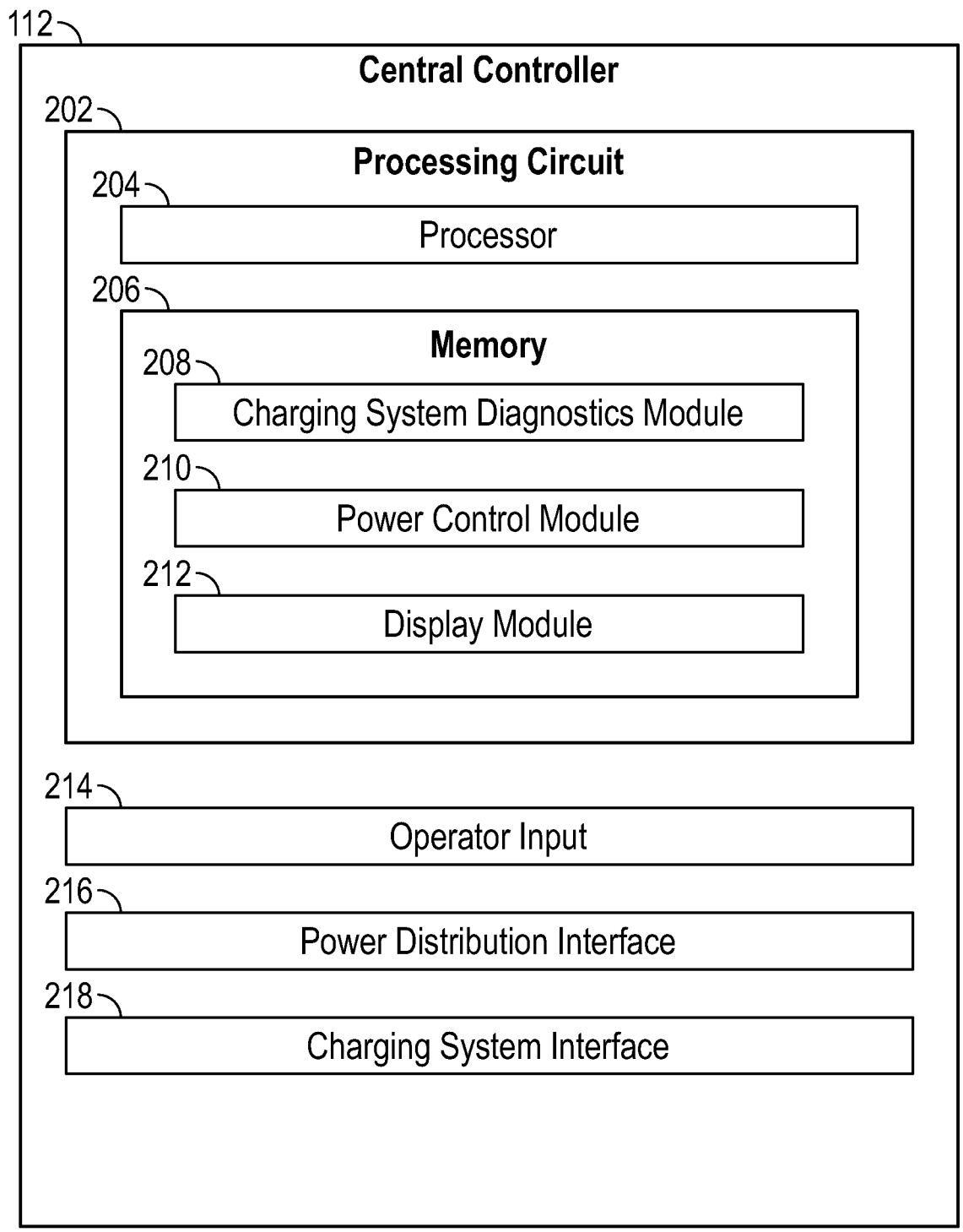
FIG. 2 is a block diagram of a controller for a vehicle, according to an exemplary embodiment.

Referring now to FIG. 2, a more detailed view of the controller 112 of the vehicle 100 of FIG. 1 is shown, according to an exemplary embodiment. The controller 112 includes a processing circuit 202 including a processor 204 and a memory 206. Processor 204 may be a general purpose or specific purpose processor, an application specific integrated circuit (ASIC), one or more field programmable gate arrays (FPGAs), a group of processing components, or other suitable processing components. Processor 204 may be configured to execute computer code or instructions stored in memory 206 or received from other computer readable media (e.g., CDROM, network storage, a remote server, etc.) to perform one or more of the processes described herein. Memory 206 may include one or more data storage devices (e.g., memory units, memory devices, computer-readable storage media, etc.) configured to store data, computer code, executable instructions, or other forms of computer-readable information. Memory 206 may include random access memory (RAM), read-only memory (ROM), hard drive storage, temporary storage, non-volatile memory, flash memory, optical memory, or any other suitable memory for storing software objects and/or computer instructions. Memory 206 may include database components, object code components, script components, or any other type of information structure for supporting the various activities and information structures described in the present disclosure. Memory 206 may be communicably connected to processor 204 via processing circuit 202 and may include computer code for executing (e.g., by processor 204, etc.) one or more of the processes described herein.

The memory 206 is described below as including various modules. While the exemplary embodiment shown in the figures shows each of the modules 208-212 as being separate from one another, it should be understood that, in various other embodiments, the memory may include more, less, or altogether different modules. For example, the structures and functions of one module may be performed by another module, or the activities of two modules may be combined such that they are performed by only a signal module. Additionally, it should be understood that any of the functionalities described as being performed by a module that is a part of the controller 112 below may also be performed by a separate hardware component having its own processors, network interfaces, etc.

As shown in FIG. 2, the controller 112 includes an operator input 214. The operator input 214 is configured to receive inputs from an operator or other personnel and provide various inputs to vehicle subsystems (e.g., electrical loads 116-122, the engine 104, etc.). The operator input may include one or more buttons, knobs, touchscreens, switches, levers, joysticks, pedals, or handles and associated hardware and software combinations (e.g., analog to digital converters and the like) to convert operator interactions with such components into readable control signals. For example, the operator input 214 may include a control panel including a number of buttons. Each of the buttons may be associated with one of the electrical loads 116-122. In response to a user selecting one of the buttons, the controller 112 may provide a control signal to the power distribution module 114 so as to cause the power distribution module 114 to decouple the indicated load from the charging system 102. In another example, the operator input 214 may also include an accelerator pedal enabling the operator to provide an input signal to the engine 104.

As shown in FIG. 2, the controller 112 includes a power distribution interface 216 and a charging system interface 218. Interfaces 216-218 communicably couple the controller 112 to the charging system 102 and the power distribution system 114. As such, interfaces 216-218 may be any hardware and/or software compatible with the various connections between controller 112 and these components. In some embodiments, the vehicle 100 includes various data lines (not shown) connecting the various components herein. Accordingly, interfaces 216-218 discussed above may include a jack, a solder point, and/or other hardware for physically coupling the controller 112 to the charging system 102 and power distribution system 114.

Via the charging system interface 218, for example, the controller 112 may receive electrical power from the battery and/or sensor signals from various sensors distributed throughout the charging system 102 (e.g., a voltmeter measuring the output voltage of the battery, an ammeter measuring an output current of the alternator 106, etc.). In another example, via the power distribution interface 216, the controller 112 may provide electrical control signals configured to selectively open or close various switches in the power distribution module 114 to selectively decouple various electrical loads 116-122 from the charging system 102.

As shown in FIG. 2, the memory 206 includes a charging system diagnostics module 208, a power control module 210, and a display module 212. The charging system diagnostics module 208 is structured to cause the processor 204 to receive and analyze various signals from the charging system 102. In an embodiment, the charging system diagnostics module 208 includes a data logging module configured to store periodic measurements received from various sensors distributed throughout the charging system 102 (e.g. at the voltage regulator 108 and battery 110) in the memory 206. Such data may be viewable to the user via the display 116. As such, the user may monitor the performance and status of various components of the charging system 102.

Additionally, the charging system diagnostics module 208 may include modules configured to assess the data received from the charging system 102 to identify various faults in the performance of the charging system 102. For example, via the charging system diagnostics module 208, the processor 204 may compare data generated by a rotational sensor measuring the rate of rotation of a rotor coil of the alternator 106 to current or voltage produced by the alternator 106. If the relationship between these values is outside of a previously measured performance curve, for example, the controller 112 may identify a defect in the coupling between the rotor coil and the engine. Alternatively or additionally, other current measurements measured throughout the alternator 106 (e.g., prior to the rectifier diodes) may be used to identify other malfunctioning equipment within the alternator 106 (e.g., the solid state devices themselves).

Additionally, the charging system diagnostics module 208 identifies faults in the operation of the battery 110. For example the charging system diagnostics module 208 may compare a the rate of charging of the battery 110 (e.g., based on the output voltage of the battery) to the level of field current being produced by the alternator 106. If the relationship between these values is outside of a previously measured performance curve, for example, the controller 112 may identify a defect in the battery 110. Alternatively or additionally, the charging system diagnostics module 208 may assess the rate of discharge of the battery 110 as a function of the electrical loads 116-122 to which the power distribution module 114 is supplying power. If the rate of discharge is greater than a previously measured discharge rate, for example, the processor 204 may identify a fault in the performance of the battery 110.

The power control module 210 is configured to selectively decouple electrical loads 116-122 from the charging system 102 in response to certain conditions being detected. For example, in the event that the controller 112 detects a defect in the operation of the battery 110 or alternator 106, the power control module 210 may generate a control signal configured to cause the power distribution module 114 to decouple a default set of electrical loads from the charging system 102. The default loads may be pre-selected by the manufacturer of the vehicle 100 and may include generally less critical electrical loads (e.g., a cigarette lighter) for the operation of the vehicle 100. This way, in the event of a charging system malfunction, power is only provided to the most critical electrical loads 116-122. In some embodiments, there are multiple sets of default electrical loads that may be decoupled from the charging system 102. For example, a first set of default electrical loads may be decoupled in the event of a battery malfunction while a second set of default electrical loads may be decoupled in the event of an alternator malfunction.

Alternatively, the electrical loads 116-122 that are decoupled from the charging system 102 may be selected by the user. For example, upon detection of low level of power generation (e.g., resulting from the vehicle 100 idling, or a charging system malfunction), the controller 112 (e.g., via the display module 212 discussed below) may present the user with an interface listing the various electrical loads 116-122 coupled to the charging system 102. The user may select from this list which loads to decouple from the charging system 102. This way, the user can prioritize electrical loads in the event that insufficient power is available.

As shown in FIG. 2, the memory 206 further includes a display module 212. The display module 212 is structured to cause the processor 204 to generate various displays for viewing by the display 116. In the example embodiments shown, the displays presented via the display 116 may vary depending on various inputs received from the operator or other user. For example, the display module 212 may include a menu navigation module (not shown). The menu navigation module may present the operator with a menu interface presenting various options to the operator. Each option may include a selectable widget configured to cause the display module 212 to generate and/or retrieve a particular display in response to the operator's selection of the widget (e.g., by the operator touching the screen of the display 116 in a position that corresponds to a particular widget).

For example, the menu interface may include a charging system widget. In response to the operator selecting the charging system widget, the display module 212 may cause the processor 204 to present the operator with the status of the charging system 102. Such a display may, for example, identify current operational status of the vehicle alternator 106 (e.g., current or voltage generation of the alternator 106 versus engine RPM), a level of charge of the battery 110, and the electrical loads 116-122 that are currently connected to the charging system 102 via the power distribution module 114. Additionally, the charging system widget may enable the user to select sets of electrical loads 116-122 that are disconnected from the charging system 102 when deficiencies or malfunctions of the charging system 102 are detected in accordance with the systems and methods disclosed herein.

While display module 212 is described with reference to the vehicle 100 in FIG. 2, it should be understood that display module 212 may provide the same or a similar type of interface, with the same, similar, or different types of features (e.g., touchscreen input capability, etc.) external user devices (e.g., smartphones) as well (e.g., via a wireless communications interface).

Figure 3:
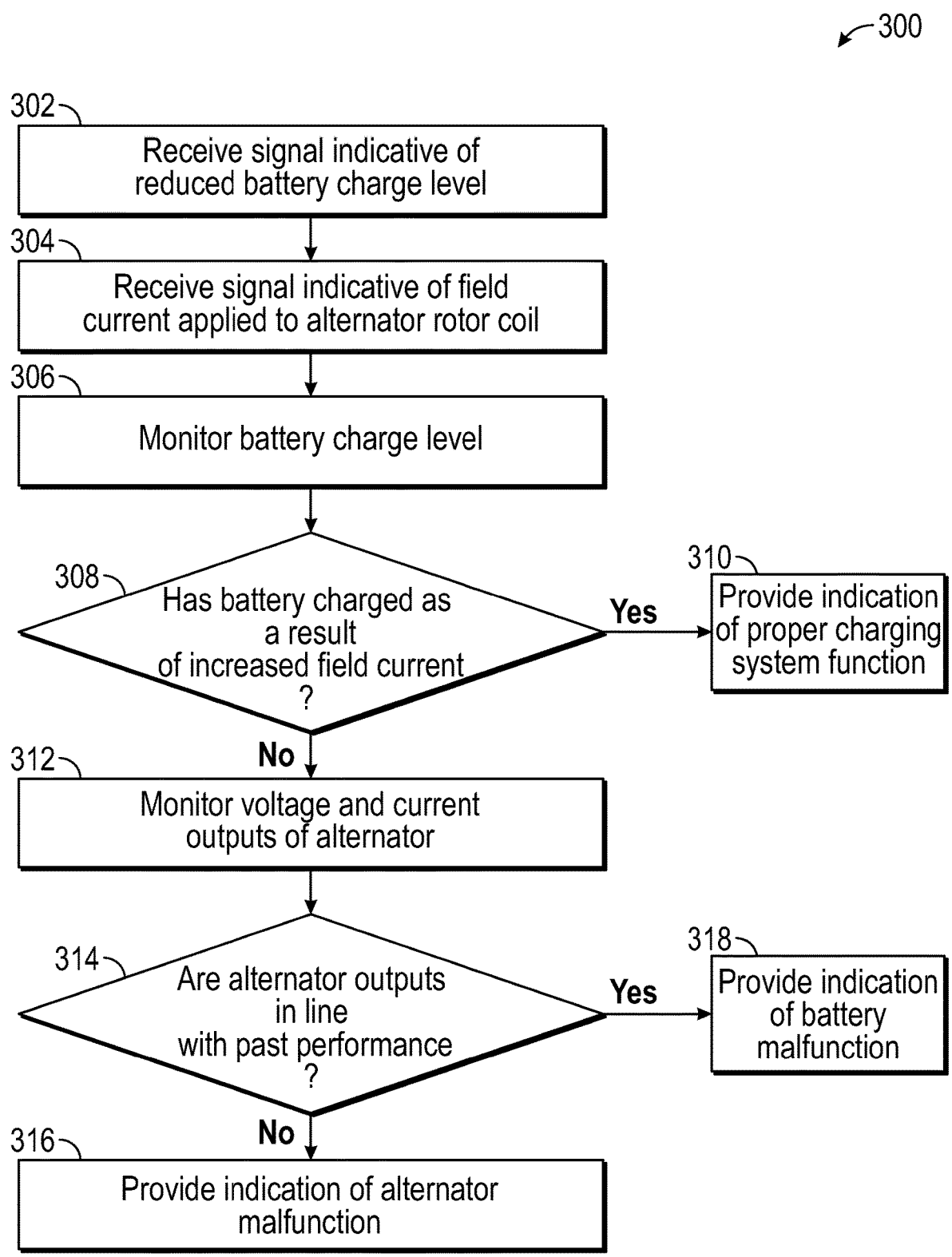
FIG. 3 is a flow chart of a process for detecting a malfunction in a charging system of a vehicle, according to an exemplary embodiment.

Referring now to FIG. 3, a flow chart of a process 300 for detecting a malfunction in a charging system of a vehicle, according to an exemplary embodiment. Process 300 may be executed by, for example, the charging system diagnostic module 208 of the controller 112 of the vehicle 100 discussed above. Process 300 may be executed to determine that electrical loads connected to the charging system 102 are to be disconnected.

Process 300 includes receiving a signal indicative of a reduced battery charge level (block 302). In some embodiments, the charge in the battery 110 is reduced due to the number of electrical loads 116-122 coupled to the charging system 102. For example, a user may utilize a windshield wiper system on the vehicle 100 in the event of a rainstorm. Such an increase in the electrical load placed on the charging system 102 may cause a diminution of battery charge. As such, a voltmeter may be attached to the electrodes of the battery 110 in the vehicle 100, and the controller 112 may periodically record signals generated by the voltmeter. If such a signal drops below a predetermined threshold, that is an indication of a reduced battery charge level. In some embodiments, the indication is received via monitoring the performance of the alternator 106. For example, if field current supplied by the voltage regulator 108 rises above another threshold, that may also be an indication of a reduced charge level of the battery 110 (because the electrical motive force produced by the battery is insufficient to overcome that produced by alternator).

Process 300 includes receiving a signal indicative of the field current applied to an alternator rotor coil (block 304). As discussed above, the voltage regulator 108 is configured to increase the amount of field current supplied to the rotor coil of the alternator 106 to increase the current induced in the stator coils, thereby increasing the charge level in the battery 110. Thus, in a properly functioning charging system 102, in response to the indication received at step 302, the field current supplied to the rotor coil would increase. Accordingly, the controller 112 receives (e.g., via an ammeter coupled to slip rings connected to the rotor coil and the charging system interface 218) a signal indicative of the level of current provided to the rotor coil. If no increase is detected, this may be indicative of a malfunctioning voltage regulator 108.

Process 300 includes monitoring battery charge level (block 306). In response to an increase in the field current applied to the rotor coil of the alternator 106 a properly functioning battery 110 will charge in response to an increase in current received from the alternator 106. Accordingly, the controller 112 continues to monitor the voltage of the battery 110 to determine if the battery is functioning properly.

Process 300 includes determining if the battery 110 has charged as a result of the increased field current (block 308). For example, the controller 112 may compare successive measurements returned by the voltmeter measuring the voltage output of the battery 110. If power generated by the battery 110 is being supplied to various electrical loads 116-122 of the vehicle 100, a neutral or relatively slow decline in the battery 110's voltage may be consistent with the battery receiving charge from the alternator 106. Accordingly, the controller 112 may identify the electrical loads 116-122 that are currently being powered, and compare temporal variations in the voltage level of the battery 110 to voltage levels at previous times when a similar set of electrical loads 116-122 was being powered by the battery 110.

If the battery 110's charge level is in line with previously-measured values, the controller 112 provides an indication of proper charging system function (block 310). For example, a graphical interface may be presented to a user on the display 116 that indicates that the charging system 102 is functioning properly. Alternatively or additionally, warning lights on the dashboard 122 may not be provided with current, thus indicating no problems with the charging system 102.

If the temporal variations of the battery 110's charge deviate from previous values (e.g., if the battery 110 is not charging, or if the battery 110's voltage level is declining more quickly than a previously measured rate), the controller 112 may monitor voltage and current outputs at various stages (e.g., after or prior to the rectifying diodes, at the output to the battery, at the output of each of the stator coils, etc.) of the alternator 106 (block 312). Such values may be measured as a function of field current provided to the rotor coil. Additionally, in some embodiments, the controller 112 receives a signal from a motion detector configured to measure the rate of rotation of the rotor coil.

Process 300 also includes determining if the outputs of the alternator 106 are in line with past performance (block 314). If a voltage or current level at a particular point in the alternator 106 is not at a level that is in line with previously measured values (e.g., as a function of field current provided to the rotor coil or the rate of rotation of the rotor coil), the controller 112 may provide an indication of alternator malfunction (block 316). For example, a malfunction notification may be provided via the display 116. The malfunction notification may indicate to a user that the alternator 106 is not functioning as previously. Additionally, the notification may identify the portion(s) of the alternator 106 that were detected to be deficient. For example, if the rate of rotation of the rotor coil mismatches an RPM level of the engine 104 by more than what is usual, the notification may indicate that there is a defect in the rotational coupling between the engine 104 and the rotor coil. In another example, if the current measured prior to the rectifier diodes is in line with previously measured values, but the current after the rectifier diodes is less than previously measured values, the notification may indicate to the user that there is a problem with the rectifier diodes (e.g., in a connection joint).

If the outputs in the alternator 106 are in line with previously measured values, however, the controller 112 may provide an indication of a battery malfunction (block 318). In other words, if the battery charge level is decreasing by more than a previously measured amount and the alternator 106 is functioning properly, then there is likely an issue with the operation of the battery 110. Accordingly, the controller 112 provide a battery malfunction notification to the user via the display 116. The battery malfunction notification may indicate to the user that the battery is not functioning properly, and provide a charge level of the battery 110 and an estimated time of complete battery discharge (e.g., determined based on the current level of power usage of the vehicle 100).

In various embodiments, upon detection of either a malfunction in the alternator 106 or the battery 110 (e.g., at block 308 or block 314), the controller 112 may selectively decouple various electrical loads 116-122 from the charging system to allocate the limited electrical power available to more essential loads (e.g., an engine control unit, braking system, etc.). For example, the controller 112 may provide control signals to the power distribution module 114 causing the power distribution module 114 to open electrical switches associated with the electrical loads 116-122 that are to be decoupled from the charging system 102.

In some embodiments, the particular set of electrical loads that is decoupled varies depending on the particular defect detected. For example, if an alternator issue is detected, the controller 112 may only provide power to the most essential electrical loads 116-122 of the vehicle 100 (e.g., engine 104, braking system, transmission, etc.). In some embodiments, the user may select the electrical loads 116-122 that may remain connected to the charging system 102 in the event of a charging system malfunction. For example, the user may be able to set which electrical loads are decoupled by the controller 112 upon detection of a particular malfunction. Accordingly, the user may select a first set of electrical loads 116-122 to decouple from the charging system 102 when a battery defect is detected and a second set of electrical loads 116-122 to decouple when an alternator defect is detected. Thus, the controller 112 may decouple the first set of electrical loads 116-122 upon detecting a battery defect and the second set of electrical loads 116-122 upon detection of an alternator defect.

Figure 4:
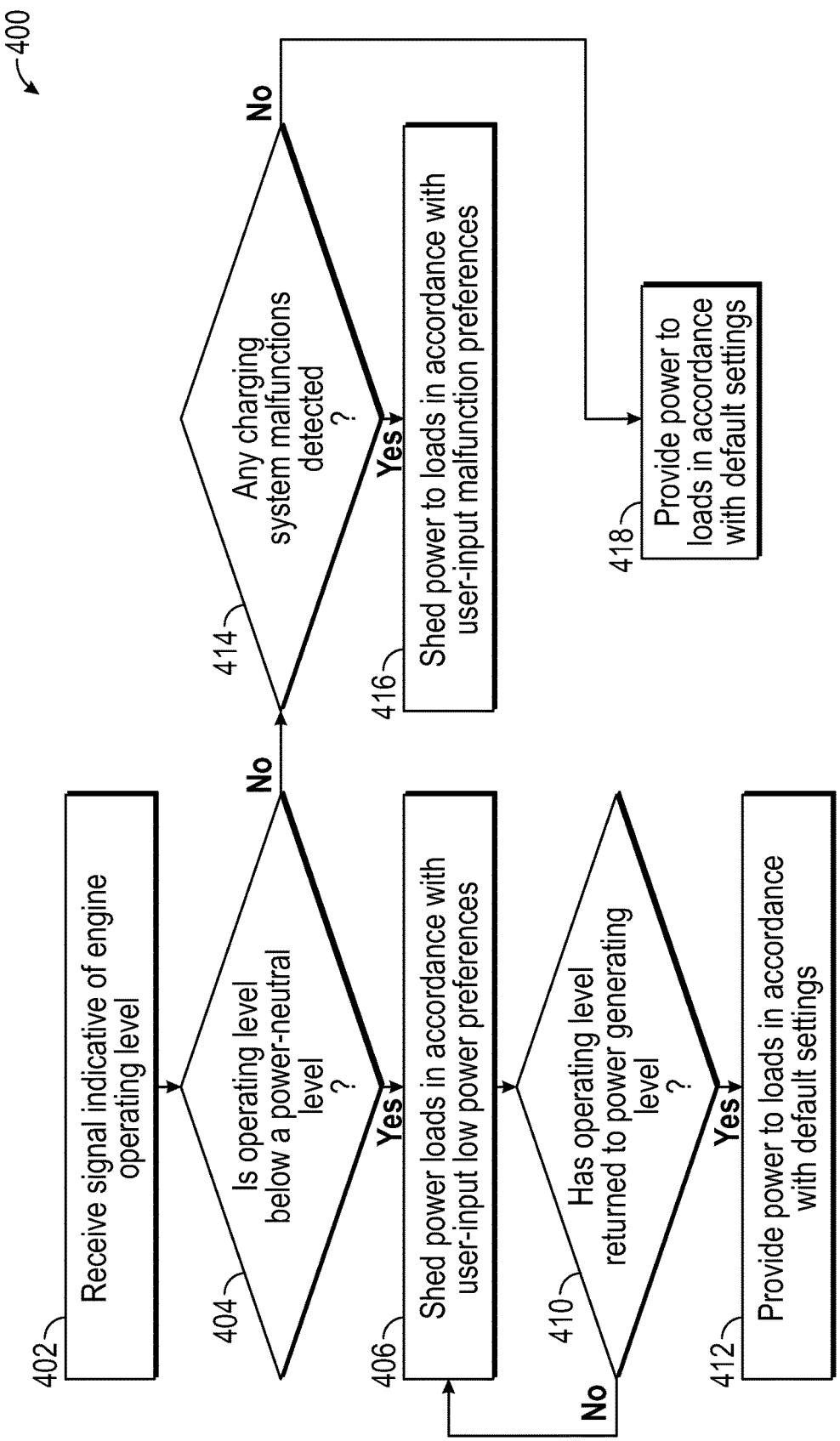
FIG. 4 is a flow chart of a process for selectively shedding electrical loads from a charging system of a vehicle, according to an exemplary embodiment.

Referring now to FIG. 4, a flow chart of a process 400 for selectively shedding electrical loads from a charging system of a vehicle is shown, according to an exemplary embodiment. Process 400 may be executed by, for example, the charging system diagnostic module 208, power control module 210, and display module 212 of the controller 112 of the vehicle 100 discussed above. Process 400 may be executed to optimize the set of electrical loads connected to a charging system of a vehicle given the state of operation of the charging system.

Process 400 includes receiving an indication of an engine operating level. For example, the engine 104 of the vehicle 100 may include sensor configured to generate a signal that corresponds to the operational rate of the engine 104. The controller 112 may receive such a signal via an interface (e.g., similar to the charging system interface 218 discussed above).

Process 400 also includes determining the operating level of the engine is below a power neutral level (block 404). For example, the electrical loads 116-122 that are currently coupled to the charging system 102 may require a certain amount of power to function properly. Such data may be stored in the memory 206 of the controller 112. For example, the memory 206 may include various datasets describing the power usage of various sets of electrical loads 116-122. Accordingly, the controller 112 may retrieve such previous datasets and determine the amount of power required to run the set of electrical loads 116-122. Additionally, memory 206 may also include a lookup table describing the relationship between an engine RPM level and the level of current or voltage generated by the alternator 106. Thus, the controller 112 may compare the power generated by the alternator 106 given the current RPM level of the engine 104 to the amount of power required to operate the current set of electrical loads 116-122.

If the power produced by the alternator 106 is lower than what is required to run the current set of electrical loads 116-122, the controller 112 sheds power to a subset of the electrical loads 116-122 in accordance with user-input low power preferences (block 406). For example, via the display module 212 discussed above, the user may indicate various preferences regarding which electrical loads to decouple from the charging system 102 in the event that the vehicle 100 is operating below a power-neutral level (e.g., when the engine 104 is idling). Such user-input preferences may be stored in the memory 206 of the controller 112. Accordingly, these preferences may be retrieved and used to generate control signals that are provided to the power distribution module 114 to decouple the selected loads.

In some embodiments, the user is able to select which electrical loads to decouple in real time upon the detection of the vehicle 100 being in a power depleting level of operation. For example, in response to the controller 112 detecting such a level of operation, a power load selection interface may be presented to the user, enabling the user to select which electrical loads to decouple. In various alternative embodiments, the particular set of electrical loads that are decoupled may be pre-selected by the manufacturer of the vehicle 100 or another individual.

Process 400 further includes determining if the operating level of the vehicle 100 has returned to a power generating level (block 410). For example, in one embodiment, the controller 112 monitors the signal corresponding to the RPM level of the engine and, upon the RPM level of the engine 104 reaching a particular threshold, the controller may determine that the alternator 106 is able to generate sufficient power to operate the initial set of electrical loads 116-122 coupled to the charging system 102. In response to such a determination, the controller 112 may provide control signals to the power distribution module 114 to re-close the switches associated with the electrical loads shed at step 406 (block 412). As such, the systems and methods disclosed herein allow for real time adjustment of the electrical loads 116-122 connected to the charging system 102 based on the level of power production of the alternator 106.

In the event that the vehicle 100 is determined to be operating at or above a power neutral level at step 404, the controller 112 determines if any charging system malfunctions have been detected (block 414). In this regard, the controller 112 continuously performs the process 300 discussed above. Any indication of a reduced battery charge level, for example, may initiate performance of the method 300 to detect any operational defects in the charging system 102.

If performance of the process 300 reveals a malfunction in the charging system 102 (e.g., in either the alternator 106 or the battery 110) the controller 112 sheds electrical loads in accordance with user-input malfunction preferences (block 416). As discussed above, the controller 112 may enable the user to set situation-based sets of electrical loads to decouple from the charging system 102 that vary based on the particular malfunction detected in the charging system 102. Accordingly, the controller 112 may retrieve such user-input preferences and generate control signals that are provided to the power distribution module 114 to decouple the selected set of loads. In some embodiments, the particular electrical loads 116-122 that are decoupled are pre-selected by the manufacturer of the vehicle or another individual. As such, only prioritized electrical loads 116-122 are provided with power in the event of the detection of a charging system malfunction.

If performance of the process 300 does not reveal any charging system malfunctions, power is provided the electrical loads in the vehicle 100 in accordance with default settings (block 418). For example, certain electrical loads 116-122 may be automatically provided with power as a default (e.g., loads necessary for operation of the vehicle 100), while others (e.g., the radio 120) may only be provided with power in response to a user input (e.g., via the operator input 214 or display 116). Assuming proper functioning of the charging system 102, the alternator 106 provides a level of current to the battery 110 that is necessary to maintain a charge level of the battery 110. As such power is provided to the various electrical loads 116-122 in accordance with the user's preferences in a power-neutral fashion.

In some embodiments, even in the event that no malfunctioning of the charging system 102 is detected, the user may still indicate a preference to decouple certain electrical loads 116-122 from the charging system 102 (e.g., in an effort to conserve energy). For example, the user may select to decouple the display 116 when the user does not wish to use the display 116. Thus, power is conserved.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A vehicle, comprising:
   a prime mover;
   a charging system coupled to the prime mover, the charging system including a charge storing device and an alternator, the alternator being configured to convert mechanical energy generated by the prime mover into electrical energy to charge the charge storing device;
   a plurality of electrical loads electrically coupled to the charging system via a power distribution module; and
   a controller communicably coupled to the charging system, the controller configured to:
      determine, based on previously measured charge levels at previous times when a similar plurality of electrical loads was being powered by the charge storing device, an expected range for a rate of charging of the charge storing device corresponding with a field current generated by the alternator;
      receive an indication that an electrical output of the charging system is unable to provide sufficient electrical energy to each electrical load in the plurality of electrical loads, wherein the indication corresponds to the controller determining the occurrence of at least one of a charge storing device malfunction or an alternator malfunction;
      provide a control signal to the power distribution module in response to the indication, wherein the control signal is configured to cause the power distribution module to decouple a first set of the plurality of electrical loads from the charging system when the indication corresponds to a charge storing device malfunction; and
      provide a control signal to the power distribution module in response to the indication, wherein the control signal is configured to cause the power distribution module to decouple a second set of the plurality of electrical loads from the charging system when the indication corresponds to an alternator malfunction;
   wherein when the indication that the electrical output of the charging system is unable to provide sufficient electrical energy to each electrical load in the plurality of loads corresponds to the charge storing device malfunction, the indication is generated upon detecting that the rate of charging of the charge storing device is outside of the expected range corresponding with the field current generated by the alternator; and
   wherein when the indication that the electrical output of the charging system is unable to provide sufficient electrical energy to each electrical load in the plurality of loads corresponds to the alternator malfunction, the indication is generated upon detecting that a relationship of one of a current or voltage produced by the alternator and a rotational velocity of a rotor coil of the alternator is outside of a stored performance curve.

2. The vehicle of claim 1, further comprising:
   a display; and
   one or more sensors distributed within the charging system and arranged to capture data corresponding to one or more measurements within the charging system, wherein the controller is further configured to:
   control the display to display periodic measurements from the one or more sensors to a user.

3. The vehicle of claim 2, wherein the controller is further configured to:
   control the display to display each of the plurality of electrical loads from the charging system, wherein, when the controller receives a selection of one of the plurality of electrical loads, the controller provides another control signal to the power distribution module to decouple the selected electrical load from the charging system.

4. The vehicle of claim 1, wherein the plurality of electrical loads within the first set and the second set are selectable in real-time using an interface, wherein the interface generates an input corresponding to the selectable loads.

5. The vehicle of claim 1, wherein the plurality of electrical loads within the first set and the second set are predetermined selected electrical loads selected by a manufacturer of the vehicle.

6. A method of electrical load management in a vehicle, the method comprising:
   monitoring an energy output from an alternator that converts mechanical energy from a prime mover into electrical energy to charge a charge storing device;
   monitoring a charge level of the charge storing device, the charge storing device powering a plurality of electrical loads electrically coupled thereto via a power distribution module;
   determining, based on previously measured charge levels at previous times when a similar plurality of electrical loads was being powered by the charge storing device, an expected range for a rate of charging of the charge storing device corresponding with a field current generated by the alternator;
   identifying a malfunction in one of the alternator and the charge storing device, wherein the malfunction within the charge storing device is identified upon detecting that the rate of charging of the charge storing device is outside of the expected range corresponding with the field current generated by the alternator, and wherein the malfunction within the alternator is identified by comparing a relationship of one of a current or voltage produced by the alternator and a rotational velocity of a rotor coil of the alternator is outside of a stored performance curve; and
   responsive to identifying the malfunction within the charge storing device, generating one or more control signals for the power distribution module to selectively decouple a first set of the plurality of electrical loads from the charge storing device; and responsive to identifying the malfunction within the alternator, generating one or more control signals for the power distribution module to selectively decouple a second set of the plurality of electrical loads from the charge storing device.

\* \* \* \* \*